United States Patent [19]

Durand et al.

[11] Patent Number: 4,681,912

[45] Date of Patent: Jul. 21, 1987

[54] PROCESS FOR MANUFACTURING INVERSE MICROLATICES OF WATERSOLUBLE COPOLYMERS, THE RESULTANT INVERSE MICROLATICES AND THEIR USE FOR IMPROVING THE PRODUCTION OF HYDROCARBONS

[75] Inventors: Jean-Pierre Durand, Chatou; Denise Nicolas, Maurepas; Norbert Kohler, Saint Germain en Laye; Francois Dawans, Bougival; Françoise Candau, Strasbourg, all of France

[73] Assignee: Institut Francais du Petrole, Rueil-Malmaison, France

[21] Appl. No.: 742,445

[22] Filed: Jun. 7, 1985

[30] Foreign Application Priority Data

Jun. 7, 1984 [FR] France .................. 84 08906
Jun. 7, 1984 [FR] France .................. 84 08907

[51] Int. Cl.$^4$ .................................... C08J 0/00
[52] U.S. Cl. ........................... 524/827; 524/829; 524/831
[58] Field of Search .................. 524/827, 829, 831

[56] References Cited

U.S. PATENT DOCUMENTS

| | | | |
|---|---|---|---|
| Re. 28,474 | 7/1974 | Anderson et al. | 523/336 |
| 3,284,393 | 11/1966 | Vanderhoff et al. | 526/207 |
| 3,826,771 | 7/1974 | Anderson et al. | 524/817 |
| 4,021,399 | 5/1977 | Hunter et al. | 524/827 |
| 4,022,731 | 5/1977 | Schmitt | 524/166 |
| 4,070,321 | 1/1978 | Goretta et al. | 524/829 |
| 4,077,930 | 3/1978 | Lim et al. | 524/829 |
| 4,147,681 | 4/1979 | Lim et al. | 524/831 |
| 4,242,247 | 12/1980 | Pellon et al. | 260/29.6 |
| 4,330,450 | 5/1982 | Lipowski et al. | 524/547 |
| 4,435,528 | 3/1984 | Domina | 524/827 |
| 4,464,508 | 8/1984 | Easterly, Jr. | 524/801 |
| 4,521,317 | 6/1985 | Candau et al. | 252/8.55 D |
| 4,524,175 | 6/1985 | Stanley, Jr. | 524/831 |

FOREIGN PATENT DOCUMENTS

| | | | |
|---|---|---|---|
| 0074661 | 3/1983 | European Pat. Off. | 524/831 |
| 0119078 | 9/1984 | European Pat. Off | 524/831 |
| 2354006 | 5/1975 | Fed. Rep. of Germany . | |
| 0841127 | 7/1960 | United Kingdom | 524/801 |
| 2093464 | 9/1982 | United Kingdom | 524/827 |
| 2118200 | 10/1983 | United Kingdom | 524/827 |
| 2140433 | 11/1984 | United Kingdom | 524/831 |

*Primary Examiner*—Joseph L. Schofer
*Assistant Examiner*—J. M. Reddick
*Attorney, Agent, or Firm*—Millen & White

[57] ABSTRACT

By a new process, inverse microlatices of watersoluble copolymers are prepared by copolymerization within an inverse microemulsion obtained by admixing an aqueous phase containing the hydrosoluble monomers to be copolymerized, an organic phase and a non-ionic surfactant or a mixture of non-ionic surfactants, whose H L B ranges from 8 to 11.

The resultant microlatices can be diluted in water so as to form thickened solutions, which can be used to improve the production of hydrocarbons from oil formations, particularly in enhanced recovery methods or methods for preventing water inflows in producing wells.

13 Claims, 1 Drawing Figure

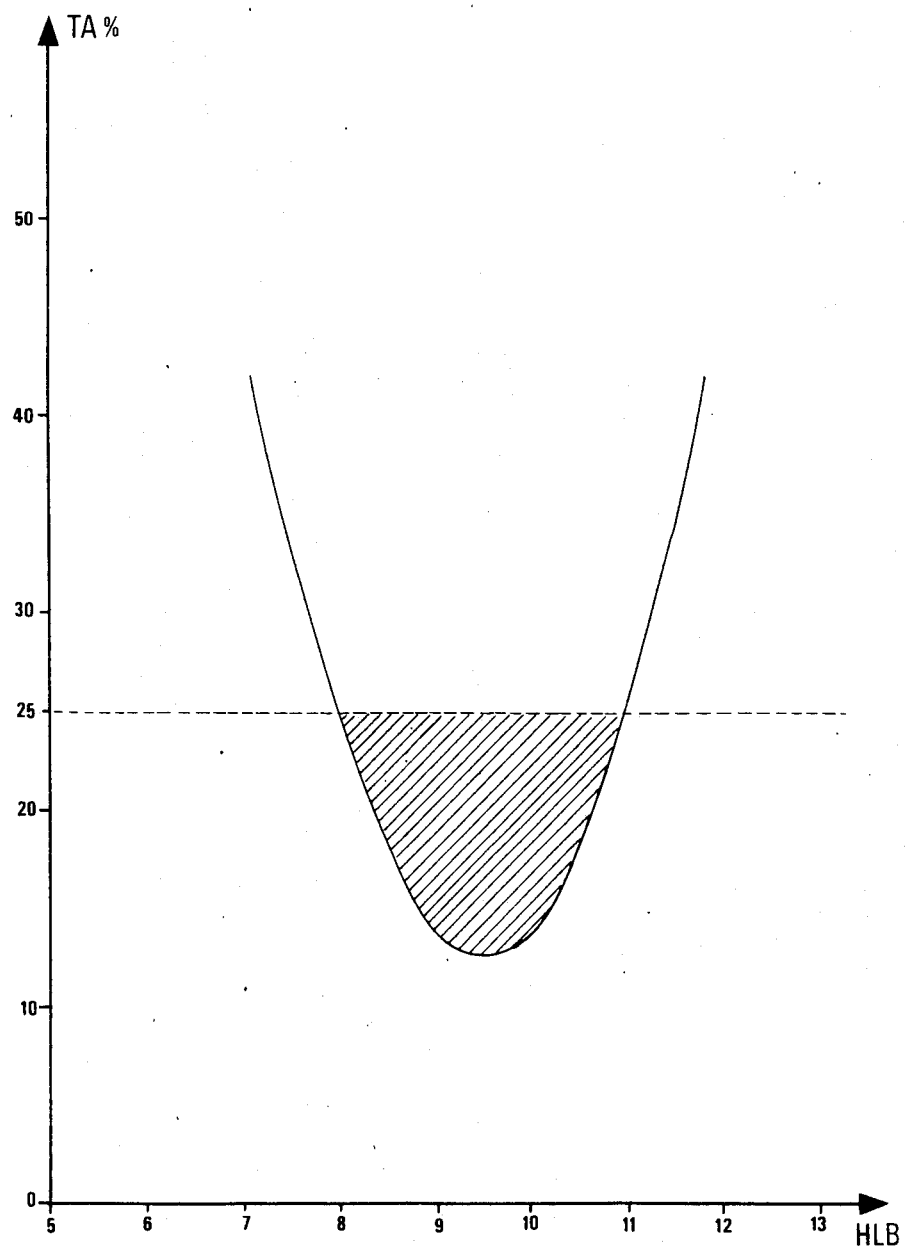

PROCESS FOR MANUFACTURING INVERSE MICROLATICES OF WATERSOLUBLE COPOLYMERS, THE RESULTANT INVERSE MICROLATICES AND THEIR USE FOR IMPROVING THE PRODUCTION OF HYDROCARBONS

The invention relates to a process for manufacturing inverse microlatices by copolymerization, in an inverse microemulsion, of at least two hydrosoluble vinyl monomers, and to the inverse microlatices obtained by this process by "hydro-soluble" is meant "water-soluble" throughout.

It also concerns the use of these inverse microlatices in the preparation of thickened aqueous solutions for improving the production of hydrocarbons.

BACKGROUND OF THE INVENTION

The energy crisis has led to the development of numerous surveys in order to recover a maximum amount of the oil present in the fields. Among the various considered methods, one of them consists of flooding the oil field by means of an injection of salt water in order to force petroleum out of the pores of the rock where it is adsorbed. However, the difference in mobility between oil and water considerably reduces the efficiency of said method. In order to improve this technique, it is known to thicken the injection water by means of hydrosoluble polymers, such as partially hydrolized polyacrylamides, acrylamide-sodium acrylate copolymers or polysaccharides:

On the other hand, it has been found that aqueous solutions, thickened by means of polymers, injected in wells simultaneously producing water and oil, limit the water production sufficiently without changing the oil production. However, the use of hydrosoluble polymers under actual conditions of use on the field, is often a delicate operation. As a matter of fact, the handling, storing and dissolution of polyacrylamides, as powder, gives rise to certain problems, particularly those due to absorption of moisture causing, formation of agglomerates, whose dissolution is time-consuming.

For this reason, new modes of conditioning hydrosoluble polymers have been proposed, particularly with inverse latices offering as a rule, all the advantages associated with liquids handling. In this connection U.S. Pat. Nos. 3,284,393, 3,624,019, 3,826,771 and 4,022,731, as well as German patent application No. DE-A-2.554.082 and British Pat. No. 2.030.578, are of particular interest.

In the formulations disclosed in these documents, the surfactant is most often selected from non-ionic surfactants having a low H L B (Hydrophilic Lipophilic Balance), providing a water-in-oil emulsion. It consists usually of a sorbitan monooleate or monostearate. On the other hand, it has been stated that certain surfactants of higher H L B are also liable to give water-in-oil emulsions (French Pat. No. 2 245 671).

However, inverse latices obtained according to the prior art methods suffer from different disadvantages, particularly an instability which results in a strong tendency to settle and in the requirement of intense and delicate shearing during their dissolution in aqueous phase, i.e. during their inversion.

More recently, it has been proposed to use inverse microlatices of hydrosoluble polymers of improved stability (French patent application No. 2 524 895), prepared by using anionic or cationic surface-active agents.

SUMMARY OF THE INVENTION

A new process for preparing stable, transparent inverse microlatices, of hydrosoluble copolymers, using certain proportions of non-ionic surfactants and resulting in increased contents of copolymers, has now been discovered. This is of particular interest in view of the use of these microlatices to form thickened solutions used for improving the production of oil fields.

The microlatices prepared by the process of the invention further have the advantage of being auto-inversable.

The process for manufacturing inverse microlatices according to the invention is generally defined by the following steps of:

(a) preparing a microemulsion (stable and transparent) of the water-in-oil type, by admixing:

(i) an aqueous solution of the acrylic monomers to be copolymerized with (ii) an oily phase, comprising at least one hydrocarbon liquid, (iii) in the presence of at least one non-ionic surfactant whose H L B value ranges from 8 to 11 (when using a mixture of surfactants, the resultant H L B is considered).

(b) subjecting the obtained inverse microemulsion of step (a) to polymerization conditions up to complete polymerization and production of a stable, transparent, inverse microlatex of high molecular weight (the term transparent also meaning translucent).

It will be recalled that an emulsion is a diphasic, turbid, unstable medium. Under stirring, particles, dispersed either in water or in oil, are observed which have a wide size distribution about an average value of the order of a micron. When polymerizing an emulsion, the polymer is dispersed in the large emulsion drops (diameter of about 1 to 10 microns) as well as in the small emulsifier micelles (diameter of about 5 to 10 nm).

A microemulsion is also formed of two liquids insoluble in each other and a surfactant, but, in contrast with the emulsion, the mere mixture of the constituents gives, without any agitation, a transparent or translucent thermodynamically stable medium.

In the formulations of inverse microemulsions leading to the microlatices of the invention, the aqueous phase contains at least two hydrosoluble acrylic monomers: on the one hand, acrylamide and/or methacrylamide and, on the other hand, at least another acrylic monomer selected from acrylic acid, methacrylic acid and alkali salts of these acids. In the mixture of acrylic monomers, the second acrylic monomer content may range from 15 to 60% by weight and preferably from 20 to 45% by weight.

In order to obtain an inverse microemulsion, it is generally necessary to use particular conditions whose main parameters are as follows: surfactant concentration, H L B of the surfactant or of the surfactant mixture, temperature, nature of the organic phase and composition of the aqueous phase.

The monomers content of the aqueous phase is generally 20–80% and usually 30–70% by weight.

Generally the pH of the monomers aqueous solution ranges from 8 to 13 and advantageously from 9 to 11.

The selection of the organic phase has a substantial effect on the minimum surfactant concentration necessary to obtain the inverse microemulsion. This organic phase may consist of a hydrocarbon or a hydrocarbons mixture. Isoparaffinic hydrocarbons or mixtures thereof are the best suitable in order to obtain inexpensive formulations (lower content of surfactants) of inverse microemulsions.

The ratio by weight of the amounts of aqueous phase and hydrocarbon phase is chosen as high as possible, so as to obtain, after copolymerization, a microlatex of high copolymer content. Practically, this ratio may range, for example, from 0.5 to 3/1; usually it is close to 2/1.

The one or more surfactants are selected in view to obtain a H L B value ranging from 8 to 11. As a matter of fact, outside this range, the inverse microemulsions either cannot be obtained, or require a considerable amount of surfactants, incompatible with an economical process. In addition, in the so-defined H L B range, the surfactant content must be sufficient to obtain an inverse microemulsion. Too low concentrations of surfactants lead to inverse emulsions similar to those of the prior art and form no part of this invention.

Within the H L B range, the surfactant concentration, in proportion to all of the constituents of the microemulsion is preferably higher than a value y (in % by weight) approximately defined by the following empirically determined equation:

$$y = 5.8\, x^2 - 110x + 534$$

wherein x is the H L B value of the surfactant or surfactant mixture.

BRIEF DESCRIPTION OF THE DRAWING

The accompanying drawing shows a curve representing the surfactant concentration versus the H L B value. On this figure, the preferred domain of the invention has been hachured.

With respect to the upper limit of the surfactant concentration, it is desirable, for economical reasons, to limit said concentration to 25% by weight of all the constituents of the inverse microemulsion.

When preparing the inverse microemulsion, the temperature of the mixture must be carefully controlled, in view of the sensitivity to temperature of the inverse microemulsions in the presence of non-ionic surfactants. This temperature influence is increased as the surfactant concentration is closer to the minimum content required for obtaining an inverse microemulsion.

In order to reduce the required surfactant content, and to limit to a minimum the temperature influence on the stability of the inverse microemulsions, the latter will be, as much as possible, prepared at a temperature as close as possible to that selected for the copolymerization.

The hydrosoluble acrylic monomers present in the above-described inverse microemulsion are polymerized photochemically or thermally: the method consists of photochemically initiating the copolymerization, for example by ultraviolet radiation or thermally by means of a free radical generator, either hydrophobic, such as, for example, azobisisobutyronitrile, or hydrophilic, such, for example, as potassium persulfate.

The copolymerization is performed very quickly, for example in a few minutes, in a photochemical way, quantitatively, and leads to the formation of stable and transparent microlatices whose particles radius is of the order of 20-40 nanometers with a narrow distribution range.

The size of the particles dispersed in the inverse microlatices according to the invention may be determined by means of the quasi-elastic light scattering. The optical source on the light scattering apparatus consists of a Spectra Physics argon-ion laser operating at 488 nm. The time dependant correlation function of the scattered intensity is derived by using a digital correlator with 72 channels. The intensity correlation data have been treated by using the method of cumulants, giving the average decay rate $<\Gamma^{-1}>$ of the correlation function and the variance V. The latter measures the amplitude of the distribution of the decay rate and its value is given by the formula:

$$V = (<\Gamma>^2 <\Gamma^2>)/<\Gamma>^2$$

wherein $<\Gamma^2>$ is the second moment of the distribution.

For copolymer solutions of low polydispersity, the variance V, as a first approximation, is related to the polydispersity index Mw/Mn (weight average molecular weight/number average molecular weight) by the relationship:

$$Mw/Mn = 1 + 4\, V$$

The molecular weight of the obtained copolymers depends to a large extent on the copolymerization temperature. Temperatures lower or equal to about 30° C. are always preferred when very high molecular weights are desired, as for inverse microlatices destined to be used in Enhanced Oil Recovery.

The process of the invention provides stable and transparent inverse microlatices of high hydrosoluble copolymer content (20 to 35% by weight). The inverse microlatices, prepared in the presence of non-ionic surfactants, have a remarkable stability to temperature in contrast with the inverse microemulsions from which they are prepared.

Inverse microlatices obtained by the process of the invention, can be used in many applications, particularly in the techniques of oil production: Hydrocarbons Enhanced Recovery, ground consolidation, manufacture of drilling muds, prevention of water inflows during the bringing in production of oil wells, and as completion or fracturation fluids.

Generally, the Enhanced Oil Recovery methods with the use of polymer aqueous solutions consist of injecting said solutions in the field through at least one injection well, to circulate it through the formation and recover the displaced hydrocarbons through at least one producing well.

The methods using inverse microlatices of the invention for Enhanced Recovery are not substantially different from those above-described for the water-in-oil emulsions. The inverse microlatices considered in this invention are auto-inversable and it is not necessary generally to add an additional surfactant to favor the inversion, as in certain above-described methods. These microlatices are used, for example after dilution in water, in a proportion on of 50 to 5000 ppm, preferably 100 to 2000 ppm by weight of copolymer with respect to the resultant aqueous phase. Tests conducted in laboratory have shown the efficiency of the inverse microlatices used.

The method for preventing water inflows in producing wells, consists of injecting into the producing well, in the part of the field to be treated, an aqueous solution of polymer, prepared according to the invention by inverse microlatex dissolution in water. The polymer is adsorbed to a large extent on the walls of the formation surrounding the well where it is injected. When said well is then brought again in production, the oil and/or the gas selectively traverse the treated zone whereas the water passage is reduced.

In addition to these applications, the hydrosoluble polymers, prepared as a microemulsion, may be used as:
coagulants for separating solids suspended in liquids
floatation and draining adjuvants in the manufacture of paper pulp; or
flocculants in water treatment The inverse microlatices obtained by the process of the invention may also be used in assembling of glass fibers, in the leather industry or in the field of paints.

EXAMPLES

The following examples illustrate the invention, but must not be considered as limiting in any way the scope thereof. Examples 1, 10 and 14 to 17 are given by way of comparison and form no part of the invention.

EXAMPLE 1 (comparative)

77,8 g of SOLTROL 220 (inorganic paraffinic oil having an distillation point of 244° C. and a final point of 287° C.), 25 g of a mixture of 21.4 g of polyoxyethylene sorbitol hexaoleate (ATLAS G 1086) and 3.6 g of sorbitan sesquioleate (ARLACEL 83) whose H L B (hydrophilic lipophilic balance) is 9.25, are admixed under stirring. 61.3 g of acrylamide and 20.7 g of glacial acrylic acid are dissolved in a mixture of 42.2 g of distilled water with 23.0 g of a 50% by weight sodium hydroxide solution and this solution is added to the oil/surfactant mixture. The amount of surfactants corresponds to 10% by weight of all the constituents. After one hour of purging with nitrogen at room temperature, the resultant emulsion (turbid and unstable) is heated to 40° C. and $6.5 \cdot 10^{-4}$ mole of t-butyl peroxypivalate per mole of monomer are added thereto, the temperature being maintained between 40° and 50° C. for about 1 hour.

The so-obtained latex is turbid and decantation takes place during storage.

EXAMPLE 2

When example 1 is repeated, but with the use of 63.5 g of surfactants mixture, which corresponds to 22% by weight of all the constituents, the resultant mixture, in contrast to example 1, is limpid and monophasic (microemulsion) and remains as such after copolymerization. By precipitation in acetone and successive washings with acetone and methanol, an acrylamine-sodium acrylate copolymer is obtained. Its viscosity in aqueous solution (400 ppm of copolymer and 5000 ppm of NaCl), measured at 30° C., is 1.30 mm$^2$/s.

EXAMPLE 3

Example 1 is repeated but as the organic solvent an isoparaffinic cut (ISOPAR M) having an initial distillation point of 207° C. and a final point of 254° C. is used and a mixture of surfactants (36.6 g) corresponding to 14% of the weight of all the constituents is used. The resultant mixture is limpid and monophasic.

After copolymerization, a monophasic mixture (microlatex) containing 35.3% by weight of acrylamide-sodium acrylate copolymer is obtained. An aqueous solution containing 400 ppm of said copolymer and 5000 ppm of NaCl, measured at 30° C. has a viscosity of 1.4 mm$^2$/s.

EXAMPLE 4

255 g of ISOPAR M and 90 g of a mixture of surfactants consisting of 12.6 g of sorbitan sesquioleate and 77.4 g of polyoxyethylene sorbitol hexaoleate (resultant H L B: 9.3) are added to an aqueous solution containing 38.25 g of acrylic acid and 89.25 g of acrylamide neutralized with sodium hydroxide to a pH close to 10. This amount corresponds to 15% by weight of all the constituents. 0.21 g of azobisisobutyronitrile is added to the resultant monophasic mixture which is degased for 1 hour and heated for 2 hours at 60° C., giving a stable and transparent microlatex whose particle radius, determined by quasi-elastic light scattering, is about 25nm, with a variance of 3%.

By precipitation in acetone and successive washings with acetone and methanol, an acrylamide-sodium acrylate copolymer is obtained (with a total conversion) whose viscosity, determined at 30° C. in a 400 ppm copolymer and 5000 ppm NaCl aqueous solution, is 1.5 mm$^2$/s.

EXAMPLE 5

Example 4 is repeated, except that azobisisobutylonitrile is omitted and the copolymerization is conducted under U.V. radiation for 5 minutes, the temperature being maintained at 20° C. With a total conversion, an acrylamide-sodium acrylate copolymer is obtained whose viscosity, measured at 30° C. in a 400 ppm copolymer and 5000 ppm NaCl aqueous solution, is 3.15 mm$^2$/s. On the other hand, the intrinsic viscosity of said copolymer, dissolved in water containing 20 g/l of NaCl, has been found equal to 3250 cc/g on the basis of measurements effected with a LS 30 viscosimeter of CONTRAVES Company and extrapolated to zero concentration and shear rate.

EXAMPLE 6

In the conditions of example 4 for carrying out the inverse microemulsion, the proportions of each of the two surfactants are varied and the minimum amount of surfactants for obtaining, after copolymerization, a stable and transparent inverse microlatex, is determined in each case.

The results are reported in the following table:

TABLE I

| HLB | Minimum surfactant concentration to obtain a stable and transparent inverse microlatex (% by weight) |
| --- | --- |
| 8.5 | 18 |
| 9 | 14 |
| 9.5 | 12 |
| 10.2 | 16 |

EXAMPLE 7

200 g of ISOPAR M and 92 g of the surfactant mixture of example 5 are added to 400 g of an aqueous solution containing 60 g of acrylic acid, 140 g of acrylamide and the sodium hydroxide amount required to attain a pH close to 10. This amount corresponds to 13.3% by weight of all the constituents. The copolymerization, conducted under the same conditions as described in example 5, provides a stable and transparent microlatex whose particles radius, determined by quasi-elastic light scattering, is about 40 nm, with a variance of 5%. This inverse microlatex contains 31.6% by weight of an acrylamidesodium acrylate copolymer containing 35.9% by weight of sodium acrylate.

The intrinsic viscosity of said polymer is 3520 cc/g (solution at 20 g/l of NaCl).

EXAMPLE 8

200 g of ISOPAR M and 106 g of the mixture of surfactants of example 4 are added to 400 g of an aqueous solution containing 40 g of acrylic acid, 160 g of acrylamide and the sodium hydroxide amount required to attain a pH of 9. This amount corresponds to 15% by weight of all the constituents. The copolymerization, conducted in the same conditions as in example 5, gives a monophasic mixture containing 30.1% by weight of acrylamidesodium acrylate copolymer containing 24.6% by weight of sodium acrylate.

The viscosity of an aqueous solution containing 400 ppm of said copolymer, determined at 30° C. in the presence of 5 g/l of NaCl, is 2.7 mm$^2$/s.

EXAMPLE 9

When, in example 8, ISOPAR M is replaced with trimethyl-pentane, everything else being unchanged, an inverse microlatex of similar characteristics as in example 8 is obtained.

EXAMPLE 10 (comparative)

When, in example 8, the isoparaffinic solvent (ISOPAR M) is replaced with an aromatic solvent (toluene), everything else being unchanged, it is impossible to obtain an inverse microemulsion, even with the addition of high amounts of surfactants (31% by weight).

EXAMPLE 11

200 g of ISOPAR M and 115 g of a mixture of surfactants containing 11% by weight of sorbitan trioleate (Montane 85) and 89% by weight of ethoxylated sorbitan trioleate (Montanox 85) are added to 400 g of an aqueous solution containing 60 g of acrylic acid and 140 g of acrylamide, whose pH has been brought to 10 by addition of sodium hydroxide. The H L B of the surfactants mixture is 10 and the surfactant amount corresponds to 16% by weight of all the constituents.

The copolymerization, conducted in the same conditions as described in example 5, gives a monophasic mixture containing 30.5% by weight of an acrylamide-sodium acrylate copolymer containing 35.9% by weight of sodium acrylate.

The intrinsic viscosity of said polymer is 3200 cc/g (in aqueous solution at 20 g/l of NaCl).

EXAMPLE 12

200 g of ISOPAR M and 115 g of the mixture of surfactants of example 11 are added to 400 g of an aqueous solution containing 170 g of acrylamide and 30 g of acrylic acid, whose pH has been brought to 9 by addition of sodium hydroxide. This amount corresponds to 16% by weight of all the constituents.

The copolymerization, achieved in the same conditions as in example 5, gives a monophasic mixture containing 29.3% by weight of an acrylamide-sodium acrylate copolymer containing 18.7% by weight of sodium acrylate.

EXAMPLE 13

200 g of ISOPAR M and 100 g of polyoxyethylene sorbitol oleate (ATLAS G 1087; H L B=9.2) are added to 400 g of an aqueous solution containing 50 g of acrylic acid and 150 g of acrylamide, whose pH has been brought to 10 by addition of sodium hydroxide. This amount corresponds to 14.3% by weight of all the constituents.

The copolymerization so-obtained copolymerization of the inverse microemulsion, conducted in the conditions described in example 5, gives a stable and transparent inverse microlatex containing 30.7% by weight of an acrylamide-sodium acrylate copolymer containing 30.3% by weight of sodium acrylate.

EXAMPLE 14 (comparative)

When example 7 is repeated, except that the proportions of the two surfactants are modified so as to obtain the resultant H L B of 7.6, it is not possible to obtain, under these conditions, any inverse microemulsion, even when adding high amounts of surfactants (more than 31% by weight).

EXAMPLE 15 (comparative)

When, in example 7, the mixture of surfactants is replaced with ethoxynonylphenol containing 8 ethylene oxide recurrent units per molecule and having a H L B of 12.3, everything else being unchanged, it is not possible to obtain in these conditions, any inverse microemulsion, even when adding high surfactant amounts (more than 35% by weight).

EXAMPLE 16 to 22

255 g of ISOPAR M and a variable amount of a mixture of surfactants having a H L B value of 9.3, already used in certain of the preceding examples (14% by weight of sorbitan sesquioleate and 86% by weight of polyethoxylated sorbitol hexaoleate are added to 255 g of an aqueous solution containing 44 g of acrylic acid and 82 g of acrylamide, neutralized with sodium hydroxide up to a pH close to 10. The amount of surfactant mixture is reported in table II hereinafter. The resultant mixture is degased and then heated at 45° C. for 45 minutes in order to copolymerize the monomers.

There is thus obtained a series of inverse latices whose final copolymer concentration is about 22 to 25% by weight with respect to all the constituents. The proportion of sodium acrylate in the copolymers is 42% by weight. Table II hereinafter reports, for the final latices, the values of optical transmission measured by turbidimetry, the hydrodynamic radii $R_H$ of the particles, determined by the quasi-elastic diffusion of light and an evaluation of the stability of said latices.

TABLE II

| Examples | Surfactant concentration (% by weight) | Optical transmission (%) | $R_H$ (nm) | Stability |
|---|---|---|---|---|
| 16* | 8.2 | 1.1 | >89 | Sedimentation |
| 17* | 11.0 | 1.2 | >60 | after a few hours |
| 18 | 13.4 | 82 | 37 | Stable |
| 19 | 15.5 | 82 | 35 | even |
| 20 | 18.0 | 85 | 27.5 | after |
| 21 | 20.2 | 88 | 25 | several |
| 22 | 21.1 | 91 | 24 | months |

*comparative examples

From this table, it appears that microlatices obtained in examples 18 to 22 are stable and have a high optical transmission and a small particle radius, in contrast with the results obtained in examples 16 and 17.

The values of surfactants or surfactant mixtures concentrations, taking into account the corresponding H L B values, were used to draw a curve shown in the accompanying FIGURE, indicating the approximative limit between a zone wherein no stable inverse microlatex is obtained and a zone wherein stable inverse microlatices can be obtained. On this FIGURE, the preferred domain of the invention has been hachured.

EXAMPLES 23 to 25

100 g of ISOPAR M and 53 g of the same surfactant mixture as in the preceding examples (H L B=9.3) are added to 200 g of an aqueous solution containing 30 g of acrylic acid and 70 g of acrylamide, neutralized with sodium hydroxide up to a pH close to 9.

The obtained monophasic mixture, to which is added 0.15 g of azobisisobutyronitrile, is degased and maintained for 5 hours at a temperature differing according to the considered example. A stable and transparent inverse microlatex is always obtained and the copolymerization is complete.

By precipitation in acetone and successive washings with acetone and methanol, acrylamide-sodium acrylate copolymers are separated and their viscosity determined, at 30° C., in aqueous solutions containing 1000 ppm of copolymer and 5000 ppm of sodium chloride. The viscosity values are different according to the copolymerization temperature:

| Example 23 | T° = 60° C. | Viscosity: 2.4 mm²/s |
| Example 24 | T° = 40° C. | Viscosity: 4.9 mm²/s |
| Example 25 | T° = 25° C. | Viscosity: 7.4 mm²/s |

EXAMPLE 26

Test of injectivity of porous medium

A porous medium is prepared by packing, in a glass cylinder, sand from ENTRAIGUES EN 38, of granulometry ranging from 28 to 50 μml. The characteristics of the so-obtained porous medium are as follows: L=60 mm, Φ=20 mm, Vp=8.6 cc, k=2.04 D, φ=45% (k=permeability to water expressed in Darcy ; φ=porosity)

A solution of acrylamide-sodium acrylate copolymer (1000 ppm) is prepared by dispersing the inverse microlatex obtained in example 7 in a field brine of total salt content close to 3 g/l. The rheological curve of said copolymer solution, as determined by means of LS 30 viscosimeter, makes apparent the presence of a plateau in the values of relative viscosity versus shear rate (relative viscosity at zero shear rate: $\eta R_o$=20, at 30° C.).

The polymer solution is then injected at constant rate (q=1.5 cc/h by means of a piston pump of perfuser type; the pressure losses are measured at the terminals of the porous medium for the polymer solution and expressed in proportion to the values initially obtained with the field brine. Thus, a mobility ratio is defined which, in the experimental conditions, becomes stabilized at a value of 21.6. It is further observed that the stabilization of the mobility decrease corresponds to an equalization of the polymer concentrations, determined by viscosimetry, between the input and the output of the core. The comparison of the mobility decrease values with the plateau viscosity on the one hand, and the absence of polymer losses between the input and the output of the porous medium on the other hand, shows that for the selected porous medium, the injectivity of the microlatex dispersion is satisfactory. Particularly, no indication of clogging was observed.

When injecting field brine after the polymer solution, a value of the permeability reduction of 2.36 is obtained, which characterizes the presence of an adsorbed polymer layer on the walls of the porous medium. This behavior is characteristic of an acrylamide-sodium acrylate copolymer of high molecular weight.

On the other hand, the fact that the permeability to water is permanently reduced makes it possible to contemplate the use of the inverse microlatices of the invention in the prevention of water inflows in producing wells, as illustrated in the following example.

EXAMPLE 27

A porous medium (L=20 cm; Φ=5 cm) is prepared by coring a Vosges sandstone containing about 10% of clay. The permeabilities of this Vosges sandstone to sea water (total salt content ≃37 g/l and to the field water (total salt content ≃8 g/l) are respectively 0.478 D and 0.467 D. The porosity is 18%.

From the microlatex of example 13, a solution is separately prepared which contains 500 ppm of active copolymer in sea water and in field water. The relative viscosities obtained in the Newtonian zone of said microlatex dispersed in both water types are respectively $\eta R_o$=5.1 (field water) and $\eta R_o$=3.1 (sea water), the ratio of the two viscosities being equal to 1.65.

In conformity with the teaching of the French Pat. No. 2 325 797 (corresponding to U.S. Pat. No. 4,095,651) issued to the name of the applicant and concerning the prevention of water inflows in producing wells, the microlatex solution (Cp=500 ppm) is injected at constant rate q=3 cm³/h ( $\gamma$=2.1 sec$^{-1}$) in sea water (t=30° C.). After injection of about 5 Pv (Pv=pores volume) of said microlatex solution, the polymer injection is discontinued and sea water is injected by the inlet face of the core in view to determine, on the one hand, the decrease of permeability $R_k$ to sea water before and after the polymer introduction and, on the other hand, to deduce therefrom a thickness of the adsorbed layer, calculated by the formula $$\delta = R_p\left(1 - \frac{1}{\sqrt[4]{R_k}}\right)$$

wherein $R_p$ designating the average pore radius is equal to $$\sqrt{\frac{8k}{\gamma}}.$$

The obtained values are as follows: $R_k$=1.80, δ=0.62 μm.

Through the outlet face of the core, field water is injected in opposite direction, thus simulating the water production in the producing well. New values of the permeability reduction and of the thickness of the adsorbed layer are thus respectively obtained: $R_k$=2.92, δ=0.90 micron. The ratio of the respective thicknesses of adsorbed layers respectively with the field water and the sea water is 1.61, value which is very close to 1.65, representing the ratio of the plateau viscosities in said two waters. This indicates that the introduction of the copolymer took place in such conditions that the thickness of the adsorbed layer varied in the same ratio as the viscosities. Accordingly, the production of soft water from the field is decreased, thereby decreasing the production water/oil ratio (WOR).

What is claimed as the invention is:

1. A process for producing a stable inverse microlatex comprising the steps of:
   (a) admixing:
      an aqueous solution containing at least one acrylic monomer (i) selected from acrylamide and methacrylamide and at least another acrylic monomer (ii) selected from acrylic acid, methacrylic acid and alkali salts of said acids, at a concentration from 20 to 80% by weight in said aqueous solution;
      an oily phase comprising at least one hydrocarbon liquid, the ratio by weight between said aqueous solution and said oily phase being from 0.5/1 to 3/1, and
      a non-ionic surfactant or a non-ionic surfactant mixture having a H L B from 8 to 11, in a proportion, with respect to all the involved constituents, higher than about a value y, given, in percent by weight, by the relationship:

$$y = 5.8 X^2 - 110 X + 534$$

wherein X is the H L B of said surfactant or said surfactant mixture, so as to form an inverse microemulsion, and
   (b) subjecting the inverse microemulsion obtained in step (a) to copolymerization conditions.

2. A process according to claim 1, wherein said acrylic monomer (ii) is sodium acrylate.

3. A process according to claim 1, wherein said acrylic monomer (ii) amounts to 15–60% by weight of the acrylic monomer mixture.

4. A process according to claim 3, wherein said acrylic monomer (ii) amounts to 20–45% by weight of the acrylic monomer mixture.

5. A process according to claim 1, wherein, in step (a), the pH of said aqueous solution is from 8 to 13.

6. A process according to claim 1, wherein, in step (a), the oily phase comprises at least one isoparaffinic hydrocarbon.

7. A process according to claim 1, wherein, in step (a), the ratio by weight between the monomers aqueous solution and the oily phase is about 2/1.

8. A process according to claim 1, wherein, in step (a), the proportion of surfactant or surfactant mixture is at most 25% by weight of all the constituents of said inverse microemulsion.

9. A process according to claim 1, wherein, in step (b), the polymerization is conducted by heating in the presence of a radical reactions initiator.

10. A process according to claim 1, wherein, in step (b) the polymerization is initiated by radiation.

11. An inverse microlatex obtained by the process according to claim 1 having a copolymer content from 20 to 35% by weight.

12. In a method for preparing a thickened aqueous solution, comprising diluting in water an inverse microlatex in such a proportion that the resultant aqueous solution has a copolymer concentration from 50 to 5000 ppm by weight the improvement wherein the inverse microlatex is one of claim 11.

13. A thickened aqueous solution, obtained by the method of claim 12.

* * * * *